Dec. 14, 1965   W. L. KUIVINEN   3,223,214
TORSIONAL VIBRATION DAMPENER ASSEMBLY
Filed Dec. 16, 1963   3 Sheets-Sheet 1

Inventor:
William L. Kuivinen
By: Thomas B. Hunter   Atty

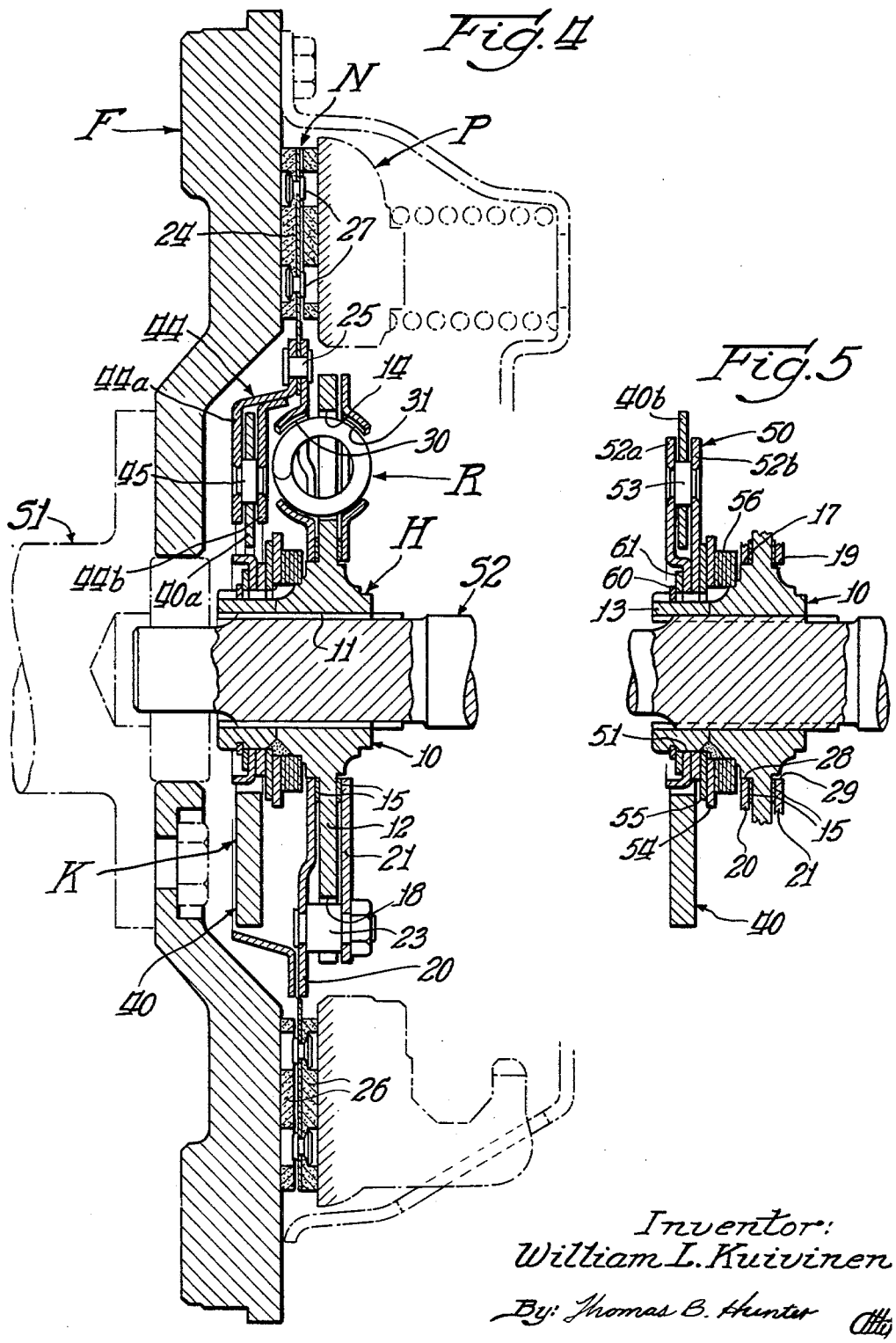

3,223,214
TORSIONAL VIBRATION DAMPENER ASSEMBLY
William L. Kuivinen, Mount Prospect, Ill., assignor to Borg-Warner Corporation, Chicago, Ill., a corporation of Illinois
Filed Dec. 16, 1963, Ser. No. 330,790
8 Claims. (Cl. 192—107)

This invention relates to improvements in torsional vibration dampener assemblies and more particularly to means for isolating and damping the torsional vibrations in the drive-line of an automotive vehicle.

Recent trends in automobile design have been toward engines having higher compression ratios and flywheel and clutch plate assemblies using lightweight materials to satisfy the public's taste for high performance and fast acceleration. In vehicles equipped with manual transmissions and conventional clutches, the sales of which incidentally still account for a large percentage of the total market, these aforementioned design trends have drastically increased the need for more effective vibration control features. The higher compression ratios, notwithstanding improvements in high octane fuels, invariably result in increased torsional vibrations which, if transmitted through the driveline, cause annoying gear rattle and may result in damage to certain components in the driveline. Moreover, the use of lower mass flywheel and clutch plate assemblies has compounded the problem. Since the amplitude of vibration is inversely proportional to the square root of the mass of the driven element, the reduction of clutch plate mass produces high excitation forces in the driveline.

Another major consideration in the vibration problem area is that of resonance. Resonance is said to exist when the natural frequency of a spring system coincides with the frequency of the excitation forces. In the case of the conventional vibration dampener assembly, this would be a function of the natural frequency of the spring system through which torque is transmitted from the driving to the driven member. When the system passes through resonance, it results in a substantial magnification of the input of forcing vibration which, in turn, causes severe gear noise and may be harmful to other driveline components such as the rear axle assembly and the universal joints. With proper damping, which is the technique employed to convert the mechanical vibration energy of the spring system into heat, the magnification factor may be held within tolerable limits.

On the other hand, while damping is useful at the resonant frequency, it reduces the effectiveness of the system at frequencies beyond the resonant point. When damping is present, the force transmitted by the elastic element is unable to overcome the damping force and therefore results in an increase in the transmissibility of input vibrations.

In the conventional automotive-type clutch plate vibration dampener, an example of which is described in U.S. Patent No. 2,636,363 (H. Nutt), damping is provided by direct frictional engagement between the driving and driven members. This is sometimes referred to as coulomb or dry-friction damping. Resonance in this type of unit occurs at approximately 17 m.p.h. and cannot be varied to any significant degree by changing the spring rate of the resilient assemblies. Resonance therefore occurs at a point on an amplitude of engine excitation vs. vehicle speed curve when the amplitude of vibrations is rather high, and because the multiplying effect is some factor such as 2.5 to 3 times the input amplitude, the transmitted vibrations are considerable.

The present invention relates to a vibration isolation system including an elastically connected coulomb or dry friction damper. The effect of this arrangement is (1) to increase the speed at which resonance occurs, (2) to reduce the transmissibility of vibrations beyond the resonance frequency and (3) to reduce the amplitude of vibrations at resonance. Since the amplitude of input vibrations is smaller at higher speeds, it necessarily follows that if the speed at which resonance occurs can be increased, the effect of the resonance amplitude multiplication factor will be less critical.

It is therefore a principal object of the invention to provide an improved vibration damper assembly which minimizes the effects of resonance.

Another object of the invention is to provide a vibration damper suitable for use with a high performance power plant or engine which has improved vibration transmissibility characteristics beyond the resonance frequency.

Still another object of the invention is to adapt an elastically connected coulomb damper system to an automotive type clutch plate assembly.

Additional objects and advantages will be apparent from the following detailed description taken in conjunction with the drawings wherein:

FIGURE 4 is a partial cross-section view taken along the plane of line 4—4 of FIGURE 3;

FIGURE 5 is a partial cross-section view taken along the plane of line 5—5 of FIGURE 3.

Figure 1:
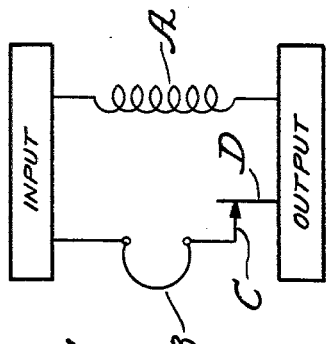
FIGURE 1 is a schematic or free body diagram of an elastically connected damper system.

Prior to setting forth a detailed description of a preferred embodiment of the invention, a brief statement of the basic principles involved would be advisable. Referring now to FIGURE 1, there is shown, in schematic form, the essential elements of a vibration isolator including elastically connected, coulomb damping means. The letter A designates some form of resilient member, such as a coiled spring connected between an input member and an output member. Connected in parallel with resilient member A is the elastically connected coulomb damping means comprising an additional resilient member B having its free end C in frictional engagement with a member D carried by the output member. It should be understood that the organization of these elements could be reversed so that resilient means B is connected to the output member and the member D connected to the input member.

Without going into unnecessary detail on the theory, the operation of the system as the input member is vibrated will be described briefly. Assuming that the system is in a neutral position with springs A and B neither in compression nor tension, movement of the input in a direction toward the output will begin to compress both springs. The damping friction between the free end C and member D will preclude relative movement between the free end and the output member. The load on both springs will increase until the load is equal to the static friction between C and D. When the friction force is overcome, the free end of the spring B will slide relative to the output member; the load on spring B will thus remain constant while the load on spring A will increase as relative movement between the input and output members is continued. At the end of the positive slope phase of the vibration cycle, movement of input and output members toward each other will reverse; friction between C and D will hold the free end C of spring B as the input and output members move apart. After passing through the neutral position, the springs are stretched or, as in the case of a clutch plate vibration dampener, the double acting springs will begin to compress in a reverse manner on the output member until the load overcomes the friction between C and D.

Figure 2:
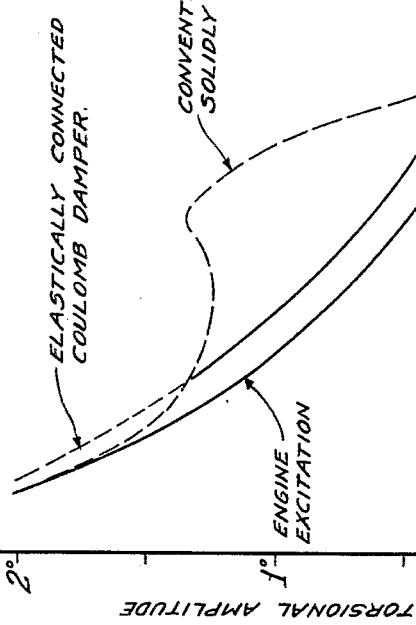
FIGURE 2 is a series of representative curves showing vibration amplitude as a function of vehicle speed in miles per hour.

In a typical automotive installation, the amplitude of the motivating vibrations decreases with increasing vehicle speed (assuming a constant gear ratio). As shown in FIGURE 2 by means of the curve labeled "Engine Excitation", the amplitude of the engine excitation vibrations, beginning at a vehicle speed of approximately 10 m.p.h., gradually decreases until about 25 m.p.h. and levels off to a relatively constant value. The inertia of the flywheel assembly at higher speeds tends to smooth out the vibrations from the engine. With a conventional driven plate assembly employing a solidly connected coulomb damper, resonance ordinarily occurs between 15 m.p.h. and 20 m.p.h. This is indicated by a peak in the curve denoted as "Conventional Clutch Assembly-Solidly Connected Damper" in FIGURE 2. The amplitude multiplying effect at resonance is approximately 2.5 thereby resulting in an amplitude of about 1½°.

In the curve designated as "Elastically Connected Coulomb Damper," which generally represents the system of the present invention, the speed at which resonance occurs is increased to approximately 25 m.p.h. At this point, the amplitude of the excitation forces has leveled out at a relatively low value and the corresponding resonant peak is considerably lower than the resonant amplitude of the conventional assembly. It should also be noted that there is continuous improvement beyond a vehicle speed of 30 m.p.h. because the elastic connection between the coulomb damper and drive (or driven) member tends to prevent the transmission of low amplitude vibrations at higher speeds. In the conventional assembly, the clutch is substantially locked up by the solidly connected friction damper. Consequently, the amplitude of the driven plate cannot be less than the corresponding value for the input member or flywheel.

One aspect of the present invention is concerned with the adaption of the elastically connected coulomb damping concept for use in a torsional vibration control assembly, more specifically for use in the driven clutch plate of a typical automotive clutch. It should be understood, however, that the basic principles have more general application and the following description is concerned only with a preferred form of the invention. It should be further understood that the terms "driving," "driven," "input" and "output," used solely to indicate the direction of torque transmission at any time, may be transposed. In other words, while the engine normally supplies the torque input, there are times, such as when the automobile is coasting, that the engine connected side of the dampener assembly is the driven member.

Figure 3:
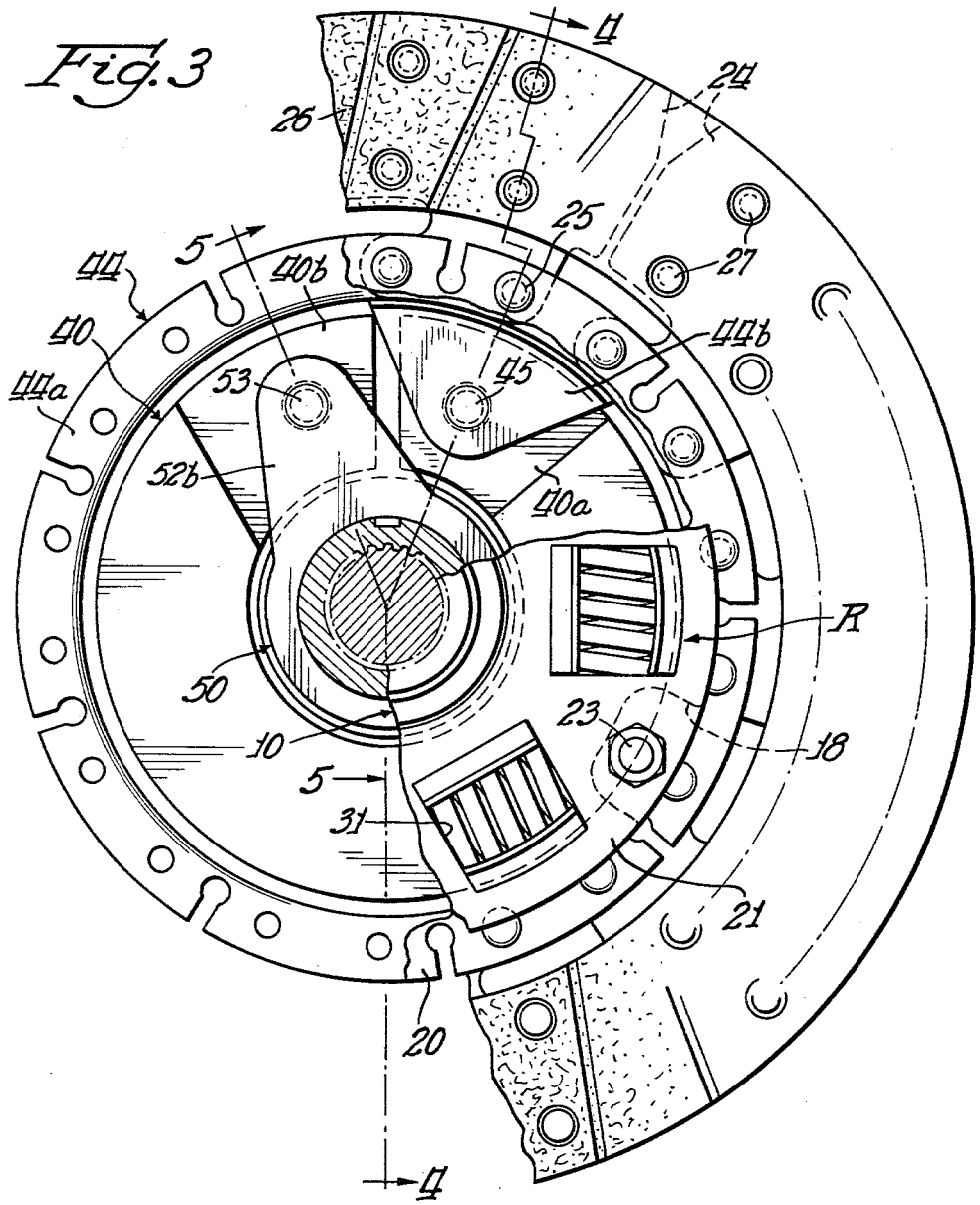
FIGURE 3 is an elevational view wtih certain portions broken away to clarify the showing of a clutch plate assembly constructed in accordance with the principles of the present invention.

As shown in FIGURES 3 to 5, a typical environment for the novel coupling or torsional vibration dampener contemplated herein (and exemplified in the drawings as applied to friction clutches) would include an engine crank shaft S1 carrying a rotatable drive member or flywheel F to which a clutch pressure plate P is drivingly connected and mounted for axial movement to effect clutch engagement of a driven plate assembly, identified as N. Driven plate assembly N is connected to the rotatable driven member or shaft S2, the proximate end of which is piloted in a bearing carried by driving crank shaft S1. The clutch plate assembly N is mounted on a hub assembly H and is drivingly connected thereto through resilient means R. The hub assembly H is suitably splined to driven shaft S2 and an elastically connected coulomb or dry friction damper assembly K is connected in parallel with the resilient means R.

The hub assembly H comprises a hub body member 10 having an annular form and including a central splined bore 11 extending therethrough, said splined bore being drivingly carried on a splined portion of the driven shaft S2. Hub member 10 is further provided with a radially extending, annular flange 12 having a plurality of windows or openings 14 which are located radially inwardly from the outer periphery of said flange for receiving the resilient means R in a manner which will be more fully explained below.

Carried on the hub assembly H is a friction facing supporting assembly comprising a pair of spaced, sheet metal side plates 20, 21 rigidly connected together by a plurality of spool fasteners 23 or by some other suitable means and arranged one each on opposite sides of the hub flange 12. It should be noted that the hub flange 12 is provided with a series of recessed portions 18 around its periphery to accommodate the side plate fastening means. These recessed portions are sufficiently large with respect to the diameter of the fasteners 23 to allow relative movement between the hub flange and the side plates.

The front side plate 20 has an outside diameter which is slightly larger than that of the rear side plate 21 and hub flange 12. This peripheral region extending radially outwardly from the hub flange provides a supporting surface for a plurality of yieldable spring cushion members 24 which are secured to side plate 20 by rivets 25. The axially spaced friction facings 26, 26 formed of a suitable composition having a high coefficient of friction, are anchored to the cushion members 24 by means of rivets 27 whereby said cushions normally space the friction facings yieldably from each other so that under the pressure which is exerted during clutch engagement said cushions are adapted to collapse against the confronting surfaces of the friction facings.

Each of side plates 20 and 21 is provided with a central circular opening 28 and 29 respectively (FIGURE 5) for rotatably supporting said side plates on a pair of corresponding shoulders 17, 19 on the hub body member 10. The side plates 20 and 21 are rather loosely arranged on the aforementioned shoulders and the radially inner portion of said side plates are spaced from the hub flange 12 by means of minimum friction washers or equivalent means. Such washers may be fabricated from polytetrafluoroethylene or similar low-friction materials. Frictional engagement between the side plates and the hub assembly H is minimized at this point.

Side plates 20 and 21 are further provided with a circular array of openings 30 and 31 which are in general registry with openings 14 in the hub flange 12. The portions of each side plate immediately adjacent to the openings 30, 31 are so shaped to provide an elongated compartment or pocket for the reception of the resilient assemblies R, which in the preferred embodiment, comprises a series of helical or coiled springs. Once in place, the springs are maintained under a minimal degree of compression between the opposite ends of openings 14 in the hub flange and the registered openings 30, 31 in the side plates 20, 21. As the side plates are moved in unison relative to the hub assembly H, the springs are engaged by the ends of the openings on the side plates and corresponding opposite ends of the openings in the hub flange to compress the springs therebetween. Consequently, relative rotational movement between the clutch driven plate and the hub assembly is resisted by the spring assemblies and torque is necessarily transmitted through said springs.

An optional arrangement whereby the resilient assemblies R are assembled with a nominal clearance between the ends thereof and the openings in the side plates may be provided. Such an arrangement would provide a lost motion connection with respect to the compression of the spring assemblies. Referring back to FIGURE 1, the resilient means A which corresponds to the resilient assemblies R in the preferred embodiment, would not be engaged until after a predetermined amount of relative motion between the input member and output member. Spring B, which corresponds to the torsion spring member in the following description, would compress until the gap was closed and spring A engaged. Then, springs A and B would compress in unison until the static friction force between C and D is equalled. At this point, the free end of spring B would move, thus keeping the load on spring B constant while spring A is still compressing. When maximum travel is realized from the forcing input, the system begins to unload. Friction element C stops moving, and springs A and B decompress until spring A is fully expanded.

As pointed out in the preliminary remarks, an important aspect of the invention resides in the provision of elastically connected coulomb damper means designated generally at K, said damper means arranged to act in parallel with the resilient assemblies R. The damper assembly K comprises a C-shaped torsion spring member 40 having one end 40a rigidly connected to side plates 20, 21 and a free end 40b elastically movable with respect to the rigidly connected end. A friction connection for coulomb damping is established (by means of spring loading or some equivalent technique) between the free end 40b of torsion spring member 40 and the hub assembly H.

As shown in FIGURES 3 and 4, the fixed end 40a of torsion spring 40 is rigidly connected to a radially inwardly extending lug 44 by a fastener 45, said lug being anchored to the peripheral portion of side plate 20 (and side plate 21) by some of the rivets 25 which connect the friction facing supporting spring cushion members to side plate 20. Lug member 44 includes spaced, parallel portions 44a and 44b, both of which are axially offset in a forward direction from said plate 20. Portion 44b, welded or otherwise secured to the lug member defines a narrow space between it and the portion 44a for the reception of the rigidly connected end 40a of torsion spring 40.

The free end 40b of torsion spring 40 is connected to a connecting member which, as designated at 50, includes a central portion having an opening 51 journalled on an axially projecting extension 13 of hub body member 10. The connecting member 50 includes a radially outwardly extending lug member comprising two axially spaced portions 52a and 52b defining a space therebetween to receive the free end 40b of torsion spring 40, said free end 40b being connected to the lug member by fastener 53.

A friction connection is established between the annular or central portion of member 50 and the hub body member 10, said friction connection including washers 54, 55 which are loaded against the back side of connecting member 50 by means of a series of Belleville springs 56. This arrangement of the washer and the Belleville springs is such that there is tight frictional engagement between the connecting member 50, which is mounted for limited rotative movement with respect to the hub member extension 13, and the hub body member 10. Axial movement of the connecting member 50 is restrained by a keeper ring 60 and washer 61. Since the bias provided by the Belleville springs produces a normal force directed generally parallel to the axes of rotation of the input and output members, friction force is substantially independent of the relative direction of rotation.

Figure 6:
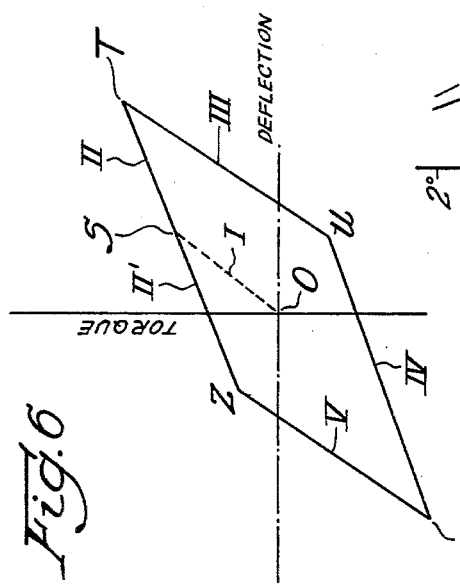
FIGURE 6 is a typical graph illustrating the angular deflection between the driving and driven member as a function of torque input.

FIGURE 6 is a typical graph illustrating the angular deflection of the drive member relative to the driven member as a function of torque input. The point designated as O represents the origin and corresponds to a neutral or no-load condition of the main spring assemblies R. The dotted line labeled I is a sharply sloping line (in an upward direction) indicating that torque transmission is resisted by both the helical spring assemblies R and the torsion spring 40. During this phase, both of the aforementioned springs are compressing because the friction connection between the free end of torsion spring 40 and the driven member (hub assembly H) prevents sliding movement therebetween. At the point designated S, the load on torsion spring 40 is sufficient to overcome the constant friction force during phase II; the free end of torsion spring 40 slides relative to the hub assembly H so that the slope of the line represents only the resistance of the spring assemblies R. At point T, relative movement between the hub member and the driven plate in a positive direction is discontinued and begins to reverse. At this point, the first negative slope phase of the vibration cycle, represented by line III, indicates that there is a relaxation or unloading of both the helical springs R and the torsion spring 40. Relative movement in a negative direction continues and after passing across the neutral or no-torque input line, the friction force provided by the frictional connection between the free end of spring 40 and the driven member is again overcome and sliding movement therebetween continues until the negative phase of the cycle is completed at point W. Phase V corresponds to the positive phase III. The line indicated as phase II' is merely a continuation of phase II, it being understood that once the system is in motion, it will not come back to the point designated as the origin O until it comes to rest. Therefore, phases II through V inclusive represent the dynamic hysteresis loop or envelope of the system.

While this invention has been described in connection with certain specific embodiments thereof, it is to be understoode that this is by way of illustration and not by way of limitation; and the scope of this invention is defined solely by the appended claims which should be construed as broadly as the prior art will permit.

I claim:
1. A torsional vibration dampener comprising:
a first rotatable member;
a second rotatable member;
first resilient means interposed between said first rotatable member and said second rotatable member and arranged to transmit torque from one of said members to the other while allowing limited relative rotational movement therebetween;
second resilient means having a first portion rigidly connected to one of said rotatable members and a second portion elastically movable with respect to said first portion; and
means establishing a frictional connection between said second portion of said second resilient means and the other of said rotatable members, said means including additional resilient means providing a normal force directed generally parallel to the axes of rotation of said rotatable members, whereby the resultant friction force is substantially independent of the relative direction of rotation.

2. Apparatus as defined in claim 1 wherein:
said first rotatable member comprises an annular clutch plate.

3. Apparatus as defined in claim 2 wherein:
said first resilient means comprises a coil spring adapted to be engaged and compressed between said first and second rotatable members.

4. Apparatus as defined in claim 3 wherein:
said second resilient means comprises a C-shaped torsion spring, said spring having one end rigidly connected to said clutch plate.

5. A torsional vibration dampener comprising:
a hub having an annular, radially extending flange;
an annular disc mounted for rotation with respect to said annular flange, said annular disc having friction facings secured to the periphery thereof and adapted to be engaged by a clutch pressure plate;
means associated with said annular disc including a plurality of spring assemblies yieldably connecting said hub flange to said annular disc and arranged so that torque is transmitted from said annular disc to said hub flange through said spring assemblies while permitting limited relative rotational movement therebetween;

an elastically connected coulomb damper connecting said annular disc to said hub, said damper including a generally C-shaped torsional spring having one end fixedly secured to said annular disc and a free end elastically movable with respect to said one end; and means for establishing a frictional connection between said free end of said torsional spring and said hub, said means including additional resilient means providing a normal force directed generally parallel to the axes of rotation of said disc and hub, whereby the resultant friction force is substantially independent of the relative direction of rotation.

6. A torsional vibration dampener assembly comprising:

a first rotatable member including a hub having an annular radially extending flange;

a second rotatable member mounted for limited relative rotation with respect to said first rotatable member, said first and second rotatable members having a plurality of generally registered openings therein, said registered openings providing pockets;

a plurality of springs adapted to transmit torque from said first rotatable member to said second rotatable member, each of said springs being positioned within one of said pockets;

a C-shaped torsional spring having one end fixedly secured to one of said rotatable members and another end elastically movable with respect to said one end; and means for establishing a frictional connection between said elastically movable end and said other rotatable member, said means including additional resilient means providing a normal force directed generally parallel to the axes of rotation of said rotatable members, whereby the resultant friction force is substantially independent of the relative direction of rotation.

7. In a clutch plate assembly, the combination comprising:

a hub having an annular, radially extending flange;

an annular disc mounted for rotation with respect to said flange, said disc having friction facings secured to the periphery thereof;

means defining a plurality of openings in said flange and said annular disc providing elongated pockets;

a helical spring received within each of said elongated pockets to provide a double acting resilient connection between said flange and said disc whereby relative rotation therebetween is resisted by said springs;

a C-shaped torsional spring having a first end rigidly connected to said annular disc and a free end elastically movable with respect to said first end; and means establishing a frictional connection between said free end of said torsional spring and said hub member, said last named means comprising at least one Belleville spring interposed between said free end and said hub member.

8. Apparatus as defined in claim 7 including:

an annular connecting member mounted on said hub member for relative rotative movement with respect thereto, said connecting member having an annular central portion and a radially extending lug; and means connecting the free end of said torsional spring to said lug, said Belleville spring being interposed between said connecting member and said hub member to establish a tight frictional connection therebetween.

References Cited by the Examiner

UNITED STATES PATENTS

| | | | |
|---|---|---|---|
| 1,734,101 | 11/1929 | Wemp | 192—55 X |
| 2,114,247 | 4/1938 | Davis. | |
| 2,149,887 | 3/1939 | Hickman. | |
| 2,636,363 | 4/1953 | Nutt. | |

FOREIGN PATENTS 116,920   3/1930   Austria.

DON A. WAITE, *Primary Examiner.*

DAVID J. WILLIAMOWSKY, *Examiner.*